Dec. 5, 1933.  E. B. FERNBERG  1,938,564
MEANS FOR PRINTING, IMPRESSING, OR EMBOSSING UPON SHEET OR STRIP MATERIAL
Filed April 2, 1930   2 Sheets-Sheet 1

INVENTOR
Eric Birger Fernberg
BY Cameron, Kerkam & Sutton
ATTORNEYS.

Dec. 5, 1933.  E. B. FERNBERG  1,938,564
MEANS FOR PRINTING, IMPRESSING, OR EMBOSSING UPON SHEET OR STRIP MATERIAL
Filed April 2, 1930   2 Sheets-Sheet 2

INVENTOR
Eric Birger Fernberg
BY Cameron, Kerkam & Sutton
ATTORNEYS.

Patented Dec. 5, 1933

1,938,564

UNITED STATES PATENT OFFICE 1,938,564

MEANS FOR PRINTING, IMPRESSING, OR EMBOSSING UPON SHEET OR STRIP MATERIAL

Eric Birger Fernberg, Edgware, England, assignor to Victor Talking Machine Company, a corporation of New Jersey Application April 2, 1930, Serial No. 441,129, and in Great Britain April 5, 1929

16 Claims. (Cl. 101—290)

This invention relates to improved means for printing, embossing or impressing by impact upon both sides of a sheet or strip of material. It has been found that when a strip or sheet of material is printed, embossed or impressed by impact upon both sides simultaneously, the material of the sheet or strip is distorted by the irregularities on the impacting surfaces with the result that imperfections appear in the finished work.

In carrying out the present invention, a sheet or strip is printed, embossed or impressed between a pair of impacting members, which print, emboss or impress the two sides in successive operations, one of said members printing or otherwise working upon one surface and the other supporting the strip during one operation and the last mentioned member printing or otherwise working upon the second surface and the first mentioned member supporting the strip during the second operation.

A printing or other die and a sheet supporting member are carried upon each of a pair of reciprocating members which move synchronously towards and away from one another, the printing die and the supporting member on each reciprocating member being movable alternately into and out of the working position opposite the supporting member or the printing die on the other reciprocating member during the reciprocating movements.

The invention is illustrated by way of example in the accompanying drawings as applied to an apparatus for printing on both sides of a strip of material at intervals along its length.

In the drawings

Figure 1:
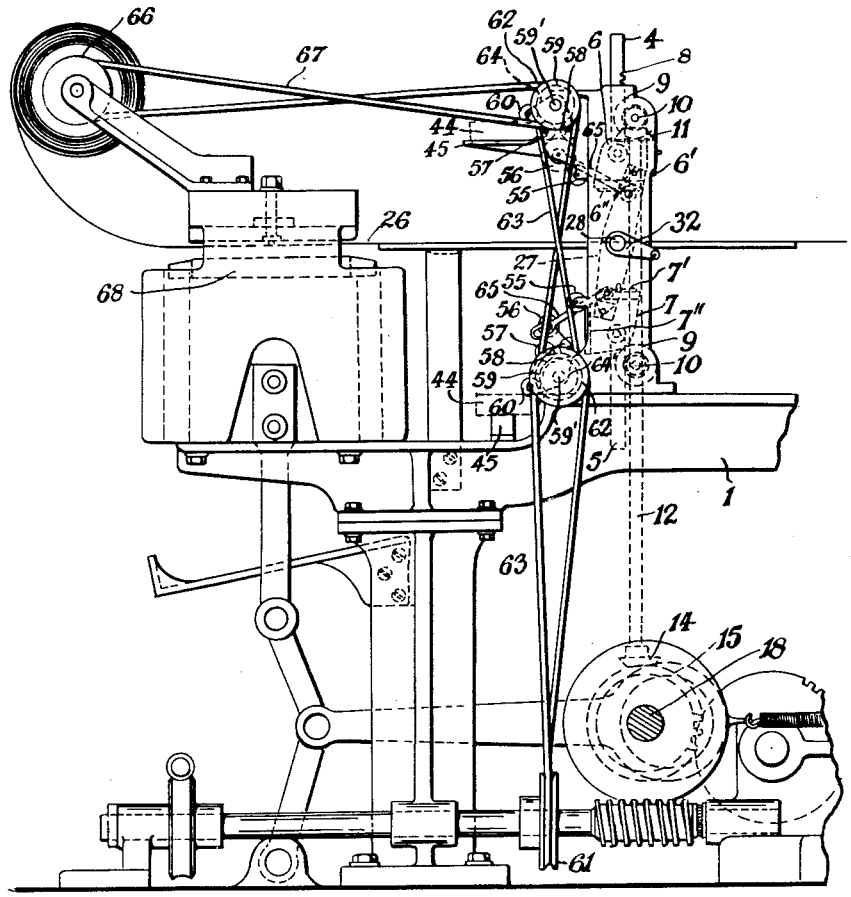
Fig. 1 is a side elevation of a complete apparatus for carrying out the invention.

Referring to the drawings, upon a base 1 are supported vertical pillars 2 which support guides 3 for vertically aligned reciprocating rods 4, 5.

The rods 4, 5 carry on their adjacent ends pivoted working members 6, 7, each having two plane surfaces 6', 6" and 7', 7" at right angles to each other and one surface of each member 6, 7 is provided with printing characters while the other remains a plane surface.

The vertically reciprocating rods 4, 5 are provided with rack teeth 8 which engage with pinions 9 on horizontal shafts 10 mounted to rotate in bearings supported by the vertical pillars 2. The horizontal shafts 10 are driven successively in opposite directions for given periods by bevel gearing 11 fixed to a single vertical shaft 12 mounted for rotation in bearings 13 on the pillars 2. During rotation of shaft 12 in one direction, the reciprocating rods 4, 5 and the members 6, 7 carried thereon move towards one another so that the members 6, 7 impact simultaneously on the two sides of a strip of material 26 to be printed while passing between them. Upon rotation of shaft 12 in the other direction, the reciprocating rods 4, 5 and members 6, 7 carried thereby move apart.

Figures 2, 3, 6:
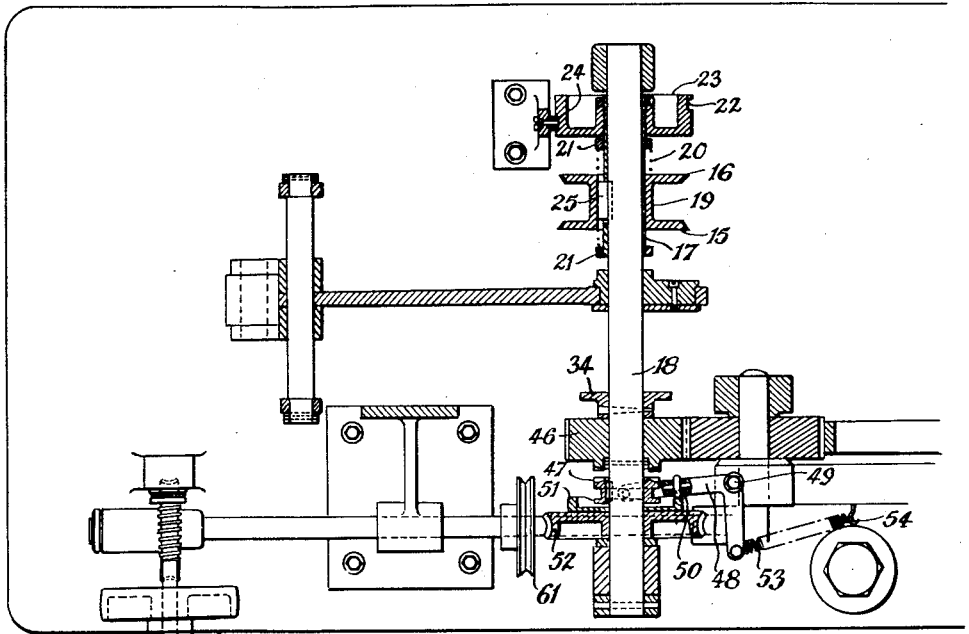
Fig. 2 is an end elevation of a part of the apparatus looking from the right in Fig. 1.
Fig. 3 is a sectional plan illustrating the driving mechanism.

For the purpose of imparting periodic rotation in opposite directions to the shaft 12, said shaft is provided with a friction pulley 14 (Fig. 2) at its lower end which pulley 14 contacts on one side or the other with one of two friction discs 15, 16 mounted to rotate with a sleeve 17 which is itself mounted to rotate with a continuously driven shaft 18.

The sleeve 17 is capable of longitudinal movement on the driven shaft 18 and the friction discs 15, 16 are spaced a fixed distance apart by a tubular connecting piece 19 which is connected by a key 25 with the sleeve 17 in such a manner as to be movable longitudinally thereof.

Adjustable compression springs 20 are provided around the sleeve 17 and between the friction discs 15, 16 and screw collars 21 on the sleeve 17 to maintain the friction discs 15, 16 in the centre of the length of the sleeve 17.

The friction discs 15, 16 are spaced apart so that the friction pulley 14 can only engage with one at a time, and the direction of rotation of pulley 14 and shaft 12 is reversed by moving the sleeve 17, carrying the discs 15, 16 longitudinally of shaft 18, to move one disc, for example disc 15, out of contact with pulley 14 and pulley 16 into contact therewith. Movements of the sleeve 17 longitudinally of the driven shaft 18 are effected through the medium of a cam groove 22 formed in the surface of a drum 23 fast with the sliding sleeve 17 on shaft 18 and a fixed pin 24 on the machine, engaging in the cam groove 22.

When the drum 23 and the sleeve 17 are moved in one direction along the driven shaft 18, one friction disc, for example disc 15, is brought into contact with the friction pulley 14 on the vertical shaft 12 and the latter is rotated to cause the reciprocating rods 4, 5 to move, for example, towards one another. When the limit of their permitted movement is reached, slip can if necessary take place between the friction pulley 14 and disc 15, through the yielding spring connection 20 until the sleeve 17 is again moved along the driven shaft 18. It will be understood that by varying the degree of compression on the springs 20 between the friction disc 15, 16 and the collars 21 on the sleeve 17 by adjusting the collars 21, the degree of friction between pulley 14 and disc 15 or 16 can be varied and thereby the weight of impact of the members 6, 7 or the rods 4, 5 which engage the material 26 to be printed.

When the sleeve 17 is moved in the opposite direction by the engagement of the fixed pin 24 in the cam groove 22, the friction pulley 14 is engaged with the other friction disc 16 and the vertical shaft 12 and shafts 10 are rotated in the opposite direction and the reciprocating rods 4, 5 and the members 6, 7 carried thereby are moved apart.

The printing upon both sides of the blank or strip 26 is effected in two operations, that is to say, during two complete reciprocating movements of the rods 4, 5.

Assume, first that the upper surface of the blank is to be printed upon. One surface of upper member 6 carrying the printing characters, for example 6'', is in a horizontal position and the plane surface 6' is vertical, while the plane surface 7' of the lower member 7 is horizontal and the surface 7'' carrying the printing characters is vertical (see Fig. 2).

Thus, when members 6 and 7 approach one another, the blank will be printed upon by surface 6'' of upper member 6, while surface 7' of lower member 7 serves merely as a support for the blank impact. The operation of printing on the upper surface having been completed, the members 6 and 7 move apart with the rods 4, 5 and the members 6, 7 are then moved about their pivots on the rods 4, 5 to bring printing surface 7'' of lower member 7 and plane surface 6' of member 6 to a horizontal position, preparatory to printing on the under-surface of the blank.

The movements of the members 6, 7 about their pivots on rods 4, 5 are effected by means of a yoke shaped lever 27 mounted to rock about a pivot 28 on one of the pillars 2.

Figures 4, 5:
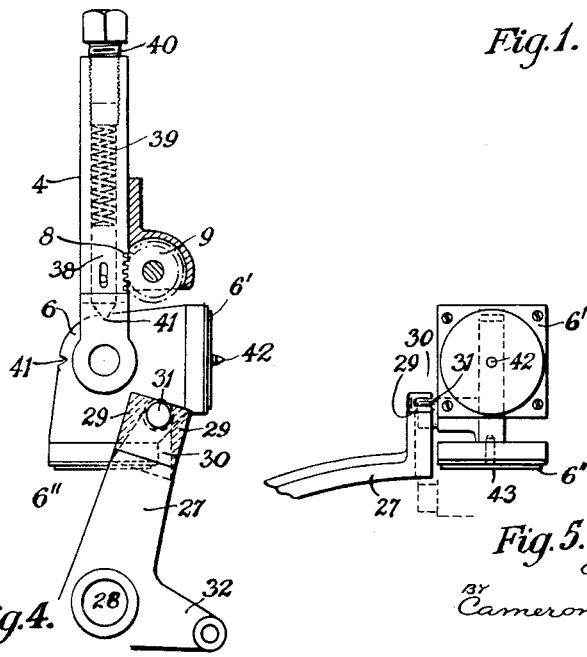
Figs. 4, 5 and 6 illustrate details.

The ends of this lever 27 are provided with shaped lugs 29 (Fig. 4) and the two lugs 29 at each end of the lever form between them a slot 30 in which engages a pin 31 projecting laterally from a member 6 or 7.

The lever 27 is connected, through a laterally extending arm 32 with, a vertically movable rod 33 having a friction rollers 33' at its lower end which engages a rotating cam 34 (Fig. 6) whereby the rod 33 is raised. The cam 34 is connected with a wheel 46 mounted upon the shaft 18 in such a manner that said shaft can rotate independently of cam 34 and wheel 46 but cam 34 and wheel 46 are incapable of movement longitudinally of the shaft. The wheel 46 and cam 34 are coupled at intervals with the shaft 18 through a clutch member 47 slidable on shaft 18 through a clutch operating lever 48 pivoted at 49 and moved by the co-operation of a roller 50 on said lever 48 with a face cam 51 on a gear wheel 52 rigid with shaft 18 to put in the clutch, and by a spring 53 connected between the lever and a fixed point 54 on the machine to put out the clutch.

A return spring 35, arranged around the rod 33 between a fixed part 36 of the machine and a collar 37, serves to urge the rod downwardly when such movement is permitted by the cam 34. The arrangement is such that when the members 6, 7 are furthest apart, the rod 33 is moved up or down to rock the members 6, 7 about their pivots on rods 4, 5. As will be seen from Fig. 4, the shape of the lugs 29 permits free passage of the pins 31 into and out of the slots 30 as the members 6 and 7 move away from or towards one another, without involving movement of members 6, 7 about their pivots. The rods 4, 5 may be formed hollow, and plungers 38, urged by compression springs 39 which are adjustable by screws 40 in screw threaded parts of the apertures in the rods 4, 5, may engage with one or other of two recesses 41 formed in the members 6, 7 to retain the latter in the positions in which they are set by lever 27.

In the case illustrated, the plane surfaces 6' and 7' of the members 6 and 7 are provided with central projecting pins 42 which, in the working position, pass through the material to be printed upon and engage in corresponding recesses 43 formed in the surfaces 6'' and 7'' thereby assisting in locating the blank.

The printing dies on surfaces 6'' and 7'' are inked during the time that they occupy the vertical position in preparation for the next operative movement, when those members occupy the horizontal position.

Two ink troughs 44 are provided on supports 45 fixed to the machines and two trains of inking rollers 55, 56, 57, 58, 59, 60 transfer ink from the troughs to the surfaces 6'', 7''.

The roller 55 of each train is mounted for rotation in fixed bearings on the pillars 2 in a position where the surface 6'' or 7'', when in the vertical position, will roll upon it to receive ink as the rods 4, 5 are reciprocated. The roller 59 of each train is mounted for rotation in fixed bearings on pillars 2 and upon a spindle 59' which is continuously driven from a constantly rotating part 61 of the machine through pulleys 62 and belts 63. The remaining rollers 56, 57, 58 and 60 of each train are mounted for rotation in bearings supported by pairs of parallel supporting plates 64, which are themselves movable about the axis of roller 59. One plate 64 of each pair is connected through a pin and slot connection with a link 65, and these links 65 in turn are pivotally connected one to each end of the rocking lever 27. Assuming, now, that the surface 7'' of the lower member 7 is in the vertical position, and the surface 6'' of upper member 6 is in the horizontal position, as indicated in Fig. 1, the position of lever 27 is such that the lower ink roller bearing plates 64 have been thrust through link 65 into a position where roller 56 of the lower train is out of contact with the fixed inking roller 55 of that train, while roller 56 remains in rolling contact with roller 55 of the upper train. In consequence, no ink is transferred to roller 55 of the lower train during the time that surface 7'' is being inked, but on the other hand, ink is transferred during the same period from roller 56 to roller 55 of the upper train and thus the last mentioned roller is prepared for inking face 6'' of member 6 when lever 27, links 65 and plates 64 are rocked.

The blank material 26 may be fed through the machine in any convenient and known manner and a drum 66 driven by a belt 67 may be provided to wind up the printed strip. If desired however, a punching die 68 may be employed to punch the printed parts from the strip 26, in which case the drum 66 can be utilized to wind up the scrap.

When the apparatus is used for embossing, the working dies corresponding to members 6, 7 may be heated in any known and convenient manner as by means of electrical resistances arranged in suitable cavities in the bodies of the dies.

I claim as my invention:

1. The method of making impressions upon a strip of material which comprises passing the strip between two impression members, resting said strip first against one of said members and making an impression thereon by the other of said members, freeing said strip from contact with said members, and subsequently resting said strip against the other of said members and making an impression thereon by the first of said members.

2. The method of making impressions upon both sides of a strip of material which comprises passing the strip between two impression members, resting said strip first against one of said members and making an impression on one side of said strip by the other of said members, freeing said strip from contact with said members, and subsequently resting said strip against the other of said members and making an impression on the other side of said strip by the first of said members.

3. The method of making impressions upon both sides of a strip of material which comprises passing the strip between two impression members, resting one side of said strip against one of said members and making an impression on the other side of said strip by the other of said members, freeing said strip from contact with said members, and then resting said other side of said strip on the other of said members and making an impression on the first side of said strip by the first of said members.

4. Apparatus of the character described including a pair of impression members each provided with a working surface and a work supporting surface, said members being normally separated from each other, and means for moving said members toward each other to bring the working surface of one of said members into cooperative relation with the work supporting surface of the other of said members.

5. Apparatus of the character described including a pair of impression members each provided with dissimilar surfaces, said members being normally separated from each other and means for moving said members toward each other to bring one surface of one of said members into cooperative relation with a dissimilar surface of the other of said members.

6. Apparatus of the character described including a pair of impression members each provided with dissimilar surfaces disposed at right angles to one another, the cooperating surfaces of each of said members lying in horizontal planes when in working position, and in vertical planes when in non-working position, and means for alternately presenting each pair of cooperating surfaces in working position.

7. Apparatus of the character described including a pair of impression members each provided with two dissimilar surfaces, and means for periodically moving said members toward and away from each other for alternate mating of the dissimilar surfaces of said members.

8. In a machine of the character described, a pair of supports, an impression member mounted on each support and including dissimilar surfaces, means for reciprocating said supports for movement of said impression members toward and away from each other, and means for alternately moving different pairs of dissimilar surfaces on said members into cooperative relation upon each reciprocal movement of said supports.

9. In a machine of the character described, a pair of supports, an impression member pivoted to each of said supports and including dissimilar surfaces, means for simultaneously reciprocating said supports for movement of said impression members toward and away from each other, and means for moving said members about their pivots to alternately bring different pairs of dissimilar surfaces on said members into cooperative relation upon each reciprocal movement of said supports.

10. In a machine of the class described, a pair of supports, an impression member pivoted to each of said supports and including dissimilar surfaces, means for simultaneously reciprocating said supports for movement of said impression members toward and away from each other, means for moving said members about their pivots to alternately bring different pairs of dissimilar surfaces on said members into cooperative relation upon each reciprocal movement of said supports, and means for preventing ready displacement of said surfaces from said cooperative relation.

11. In a machine of the character described, a frame member, a pair of rods mounted on said frame member, means for reciprocating said rods for movement toward and away from each other, an impression member pivoted on each of said rods and including a working surface and a work supporting surface, the working surface of one of said members being adapted to cooperate with the work supporting surface of the other of said members, and means for alternately moving first one pair of cooperating surfaces and then another pair of cooperating surfaces into working position while said rods are reciprocated.

12. In a machine of the character described a frame member, a pair of rods mounted on said member in vertical alignment with each other, means for reciprocating said rods for movement toward and away from each other, an impression member pivoted on each of said rods at their adjacent ends and including a working surface and a work supporting surface, the working surface of one of said members being adapted to cooperate with the work supporting surface of the other of said members, and means for alternately moving first one pair of cooperating surfaces and then another pair of cooperating surfaces into working position while said rods are reciprocated.

13. In a machine of the character described, a frame member, a pair of rods mounted on said member in vertical alignment with each other, means for reciprocating said rods for movement toward and away from each other, an impression member pivoted on each of said rods at their adjacent ends and including a working surface and a work supporting surface, the working surface of one of said members being adapted to cooperate with the work supporting surface of the other of said members, and means for intermittently moving said members through a right angle whereby to alternately present first one pair of cooperating surfaces and then the other pair of cooperating surfaces in working position.

14. In a printing machine, a pair of impression members, each having a printing surface and a non-printing surface adapted to occupy working and non-working positions, and means for alternately inking first one of said printing surfaces while the other of said printing surfaces is in working position and then the other of said printing surfaces while said first printing surface is in working position.

15. In a printing machine, a pair of impression members, each having a printing surface and a non-printing surface, the printing surface of one being adapted to cooperate with the non-printing surface of the other and vice versa, means for alternately presenting first one pair of said surfaces and then the other pair of said surfaces in working position, and means for inking one of said surfaces while the other surface is in working position.

16. In a printing machine, a pair of impression members, each having a printing surface and a non-printing surface, the printing surface of one being adapted to cooperate with the non-printing surface of the other and vice versa, means for presenting first one pair of said surfaces and then another pair of said surfaces in working position, a train of inking rollers for each of said members, and means for simultaneously rendering the inking rollers of one train inoperative and the inking rollers of the other train operative to ink the idle printing surface while said other printing surface is in working position.

ERIC BIRGER FERNBERG.